United States Patent
McKillop

(10) Patent No.: US 9,363,497 B2
(45) Date of Patent: *Jun. 7, 2016

(54) SELF-CONFIGURING MEDIA DEVICES AND METHODS

(71) Applicant: Apple Inc., Cupertino, CA (US)

(72) Inventor: Christopher D. McKillop, La Honda, CA (US)

(73) Assignee: Apple Inc., Cupertino, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 14/153,955

(22) Filed: Jan. 13, 2014

(65) Prior Publication Data
US 2014/0126878 A1    May 8, 2014

Related U.S. Application Data

(60) Continuation of application No. 13/151,973, filed on Jun. 2, 2011, now Pat. No. 8,639,371, which is a division of application No. 11/823,416, filed on Jun. 26, 2007, now abandoned.

(60) Provisional application No. 60/878,908, filed on Jan. 5, 2007.

(51) Int. Cl.
| | | |
|---|---|---|
| *H04N 9/87* | (2006.01) | |
| *H04L 29/06* | (2006.01) | |
| *H04N 21/443* | (2011.01) | |
| *H04N 21/81* | (2011.01) | |

(Continued)

(52) U.S. Cl.
CPC .............. *H04N 9/8707* (2013.01); *G06F 13/12* (2013.01); *H04L 65/607* (2013.01); *H04N 21/4126* (2013.01); *H04N 21/4437* (2013.01); *H04N 21/8113* (2013.01); *H04N 21/8193* (2013.01); *G06F 13/38* (2013.01); *G06F 15/16* (2013.01)

(58) Field of Classification Search
CPC ............... H04L 65/607; H04N 9/8707; H04N 21/4126; H04N 21/4437; H04N 21/8113; H04N 21/8193
USPC ............. 700/94; 704/500, 501; 709/230, 231, 709/232, 236, 237; 710/8, 11, 65, 68, 72, 710/106
See application file for complete search history.

(56) References Cited

U.S. PATENT DOCUMENTS

| | | |
|---|---|---|
| 2002/0067907 A1 | 6/2002 | Ameres |
| 2005/0152557 A1 | 7/2005 | Sasaki et al. |

(Continued)

OTHER PUBLICATIONS

Microsoft, "Windows Media Player FAQ—Using codecs", Dec. 10, 2006, Microsoft, http://web.archive.org/web/20061210065845/www.microsoft.com/windows/windowsmedia/player/faq/codec.mspx, all pages.

*Primary Examiner* — Jesse Elbin
(74) *Attorney, Agent, or Firm* — Blakely, Sokoloff, Taylor & Zafman LLP

(57) ABSTRACT

Systems and methods for self-configuring portable electronic devices are provided. In one embodiment, the portable device includes carrier circuitry that receives compressed data streams of information and application circuitry that decompresses the received data stream in accordance with a specific CODEC. The device includes the capability for the carrier circuitry to provide the specific CODEC required to decompress the data stream to the application circuitry. The transfer of the specific CODEC can be done as a default action or it can be done based on a queue received from the application circuitry.

17 Claims, 8 Drawing Sheets

(51) Int. Cl.
*H04N 21/41* (2011.01)
*G06F 13/12* (2006.01)
*G06F 15/16* (2006.01)
*G06F 13/38* (2006.01)

(56) References Cited

U.S. PATENT DOCUMENTS

2005/0177626 A1    8/2005   Freiburg et al.
2007/0260615 A1   11/2007   Shen

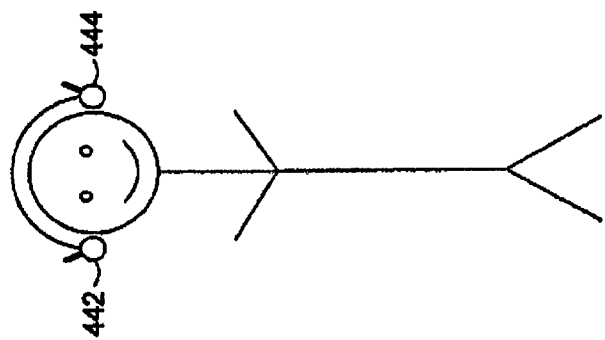
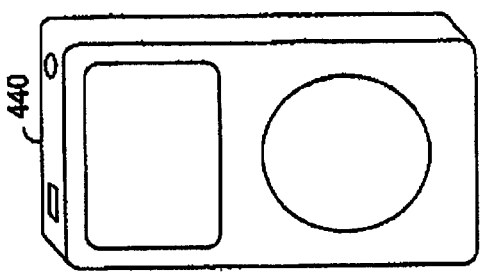
FIG. 4

SELF-CONFIGURING MEDIA DEVICES AND METHODS

This application is a continuation of co-pending U.S. application Ser. No. 13/151,973, filed on Jun. 2, 2011, which is a divisional of U.S. application Ser. No. 11/823,416, filed on Jun. 26, 2007, which claims the benefit of U.S. Provisional Application No. 60/878,908, filed on Jan. 5, 2007. Each of these disclosures is incorporated by reference herein in its entirety.

BACKGROUND OF THE INVENTION

This relates to electronic devices and more particularly to self-configuration methods and devices.

Portable electronic devices, such as wireless and cellular telephones, digital media players (e.g., music players and video players), and hybrid devices that combine telephone and media playing functionality are known. These devices are typically configured to provide communications to a user in one or more formats. For example, a video iPod may be configured to play videos in MPEG-4 format, while music is played back in MP-3 format.

The media that is communicated to the user is typically stored in a compressed format on the electronic devices so that more information may be available to the user. This is particularly true with respect to portable media devices, such as music players and cellular telephones.

There are, however, many different formats for compressing multi-media information. For example, audio signals can be stored in MP-3, AC-3 or SBC formats (as well as many other formats). In order for the electronic devices to be able to decompress the information and play it back properly to the user, or in the case of a cellular call, to be able to decompress the transmitted voice signals fast enough so that the user experiences no delay, the electronic devices must have a particular piece of software for each specific format of compression. These pieces of software are generally referred to as CODECs.

One problem many users experience, however, is that they receive a file of compressed information and the electronic devices fails to play that file back. This failure can include total failure or a partial failure, such as a movie file that only plays back the audio track. These failures are typically the result of not having the proper CODEC on the electronic device.

A present attempt at working around this problem is to load many different CODECs on the electronic device so that the devices has a higher likelihood of having the necessary CODEC for any given piece of compressed information. This "solution," however, is far from adequate because the CODECs can require a large amount of memory for storage, thereby increasing the cost of the device. In addition, regardless of how many CODECs are stored on the device, there is still always the potential for a file to be decompressed and the proper CODEC is not present on the device.

Accordingly, what is needed are methods and systems for enabling the electronic devices to obtain CODECs "on the fly" so that the proper CODEC is always available.

SUMMARY OF THE INVENTION

Systems and methods for managing the use of CODECs to enable efficient playing of compressed information are provided.

In one embodiment, self-configuration can be implemented in a device such as a cell phone that includes an application portion and a carrier portion. The carrier portion can include circuitry for performing telephone functions (e.g., transmitting data to and receiving data from a communications tower). The carrier circuitry can include circuitry for other wireless communication functions, such as to enable Bluetooth and Wi-Fi communication methods. The application portion may include all other circuitry not specifically reserved for the carrier circuitry. For example, the application portion may include a processor, memory (e.g., for storing media files), SDRAM, a display, and other circuitry. In this instance, the application portion would perform the compression and decompression using the appropriate CODEC to enable the carrier portion to transmit and receive compressed data.

The carrier portion could operate in several different manners. For example, the system could append the CODEC necessary to decompress the incoming data to the beginning of the message. The carrier would receive that CODEC and pass it on to the application portion. The application portion could automatically load the CODEC into main memory and begin processing the incoming compressed data stream in accordance with the CODEC. Alternatively, the application portion could check to see if it already has the appropriate CODEC, and if so, it could ignore the incoming CODEC.

In another embodiment, the carrier portion passes an indicator to the application portion to identify the CODEC that will be needed to process the incoming data stream. The application portion then checks to see if the necessary CODEC is resident in application memory. If the CODEC is resident, the system operates normally whereby the carrier portion sends compressed data to the application portion. The application portion then decompresses the information in accordance with the appropriate CODEC (and compresses outgoing information using the same CODEC).

If, however, the required CODEC is not resident, the application portion sends a request to the carrier portion that is passed on to the transmitting device to request the CODEC. The CODEC would then be appended to the beginning of incoming data stream. In this manner, the determination of whether the necessary CODEC was resident in memory would be part of the handshaking process that is otherwise typical in establishing communications between two devices.

In another embodiment, the transmitting device might be a stereo receiver and the receiving device might be wireless speakers. In this instance, the communications, other than administrative matters (such as handshaking, etc.), would be one-way communications because the speakers would only be operating to decompress the incoming compressed audio for playback. No compression would be required.

Various different methods for establishing communication and installing the appropriate CODEC can be utilized, such as those described above with respect to the present invention. For example, the speakers could be designed so that no CODECs are resident, in which case the CODEC would always be appended to the beginning of the incoming data stream. Alternatively, the speakers could be designed to include one or more "standard" CODECs, in which case the speakers could verify whether it already has the necessary CODEC. In addition, the speakers and the receiver could perform a pairing operation, similar to what occurs between a cell phone and a Bluetooth headset, however, in this instance, the receiver would become informed of which CODEC(s) the speakers had residing in memory so that only missing CODECs were transmitted prior to the data stream.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIG. 4 is an illustration of another embodiment of the present invention;

DETAILED DESCRIPTION OF THE INVENTION

Figure 1:
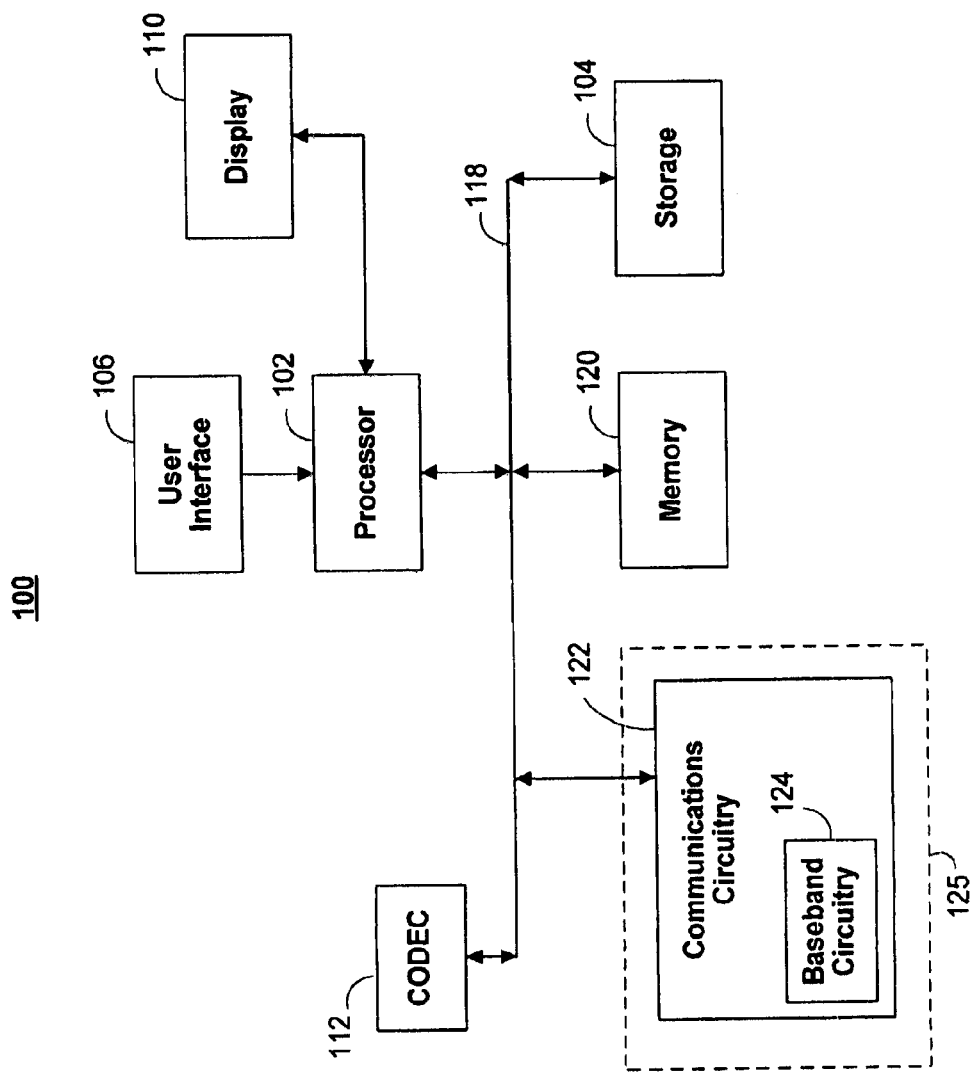
FIG. 1 shows a simplified block diagram of portable electronic device in accordance with an embodiment of the present invention.

FIG. 1 shows a simplified block diagram of illustrative portable media player 100. Media player 100 may include processor 102, storage device 104, user interface 106, display 110, CODEC 112, bus 118, memory 120 and communications circuitry 122. CODEC 112 may be a single CODEC that can be stored permanently on media player 100, or it can include multiple CODEC, depending on the amount of memory the product designer is willing to sacrifice. Processor 102 can control the operation of many functions and other circuitry included in media player 100. Processor 102 may drive display 110 and may receive user inputs from user interface 106.

Storage device 104 may store media (e.g., music and video files), software (e.g., for implementing functions on device 100, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device to establish a wireless connection such as a telephone connection), subscription information (e.g., information that keeps tracks of podcasts or television shows or other media a user subscribes to), telephone information (e.g., telephone numbers), and any other suitable data. Storage device 104 may include one more storage mediums, including for example, a hard-drive, permanent memory such as ROM, semi-permanent memory such as RAM, or cache.

Memory 120 may include one or more different types of memory which may be used for performing device functions. For example, memory 120 may include cache, Flash, ROM, and/or RAM. Memory may be specifically dedicated to storing firmware. For example, memory 120 may be provided for storing firmware for device applications (e.g., operating system, user interface functions, and processor functions).

Bus 118 may provide a data transfer path for transferring data to, from, or between storage device 104, baseband circuitry 124, memory 120 and processor 102. Coder/decoder (CODEC) 112 may be included, for example, to convert digital audio signals into an analog signal, which may be provided to an output port (not shown). For the purposes of the present invention, CODEC 112 is intended to represent the specific encoder that is required to perform whatever function media player 100 is being tasked to perform. For example, if media player 100 is being tasked to playback music files that have been compressed and stored using the AC3 CODEC, then CODEC 112 needs to be the AC3 CODEC in order for media player 100 to properly decompress and playback the music file.

Communications circuitry 122 may be included in a carrier circuitry portion (delimited by dashed lines 125) of device 100. Carrier circuitry portion 125 may be dedicated primarily to processing telephone functions and other wireless communications (e.g., Wi-Fi or Bluetooth). It is understood that the carrier circuitry portion operate independent of other device components operating in device 100. That is, carrier circuitry may be an independently operating subsystem within device 100 that may communicate with other components within device 100.

User interface 106 may allow a user to interact with media player 100. For example, the device for user input 106 can take a variety of forms, such as a button, keypad, dial, a click wheel or a touch screen. Communications circuitry 122 may include circuitry for wireless communication (e.g., short-range and/or long range communication). For example, the wireless communication circuitry may be Wi-Fi enabling circuitry that permits wireless communication according to one of the IEEE 802.11 standards or a private network. Other wireless network protocol standards could also be used, either in alternative to the identified protocols or in addition to the identified protocol. Another network standard that may be utilized may be Bluetooth.

Communications circuitry 122 may also include circuitry that enables device 100 to be electrically coupled to another device (e.g., a computer or an accessory device) and communicate with that other device. As indicated above, communications circuitry 122 may also include baseband circuitry for performing relatively long-range communications (e.g., telephone communications). If desired, communications circuitry 122 may include circuitry for supporting both relatively long-range and short-range communications. For example, communications circuitry 122 may support telephone, Wi-Fi, and Bluetooth communications.

In one embodiment, player 100 may be a portable computing device dedicated to processing media, such as audio and video. For example, device 100 may be a media player (e.g., MP3 player), a game player, a remote controller, a portable communication device, a remote ordering interface, an audio tour player, or other suitable personal device. In another embodiment, player 100 may be a portable device dedicated to providing media processing and telephone functionality in single integrated unit.

Device 100 may be battery-operated and highly portable so as to allow a user to listen to music, play games or video, record video or take pictures, place and take telephone calls, communicate with others, control other devices, and any combination thereof. In addition, device 100 may be sized such that is fits relatively easily into a pocket or hand of the user. By being handheld, device 100 is relatively small and easily handled and utilized by its user and thus may be taken practically anywhere the user travels.

Figure 2:
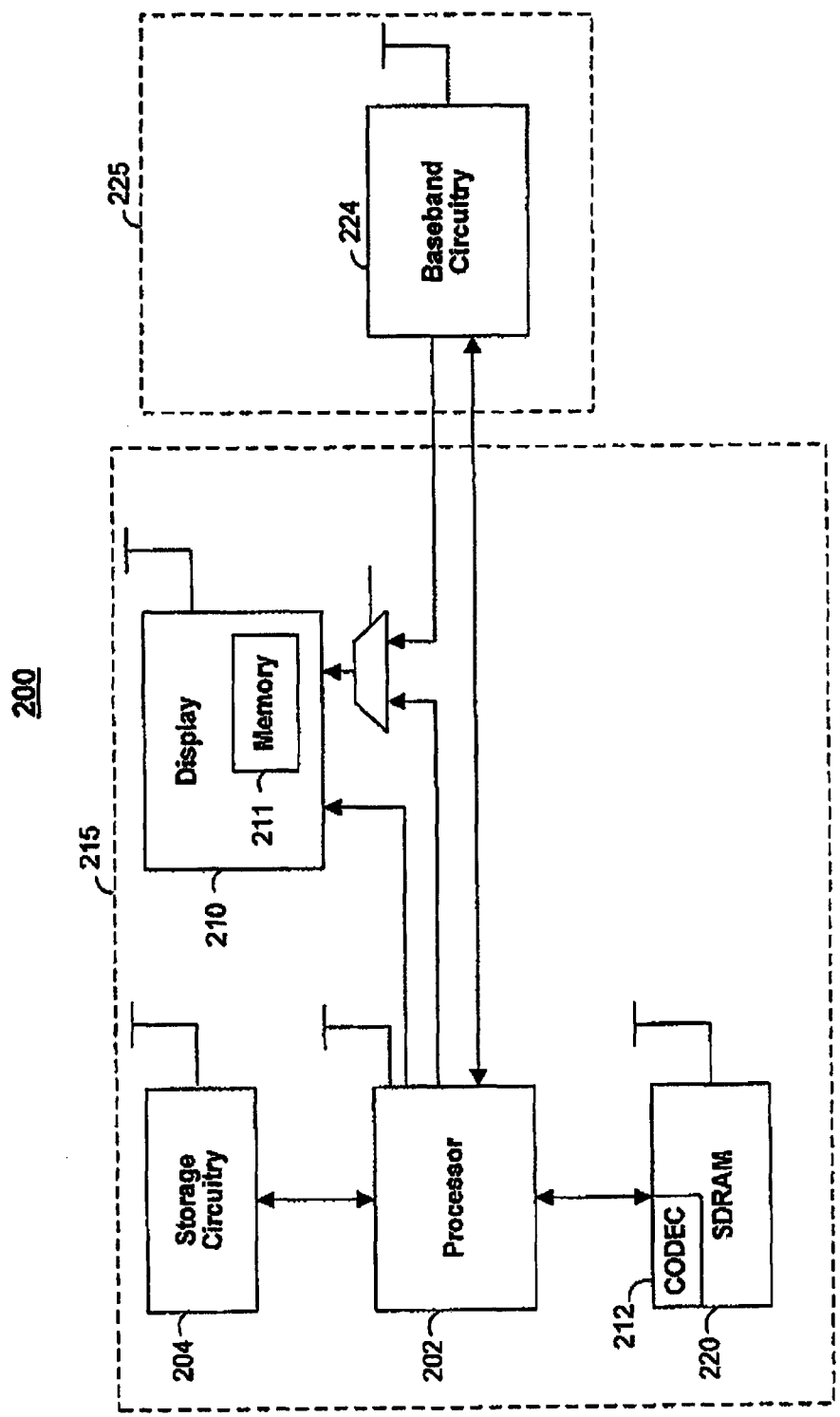
FIG. 2 is a more detailed but simplified block diagram of a device in accordance with an embodiment of the present invention.

FIG. 2 is a more detailed but simplified block diagram of illustrative device 200 constructed in accordance with the principles of the present invention. Device 200 may, for example, be a mobile or cellular telephone. As the figures are described herein, it should be noted that the use of certain nomenclatures are attempted for clarity. For example, where possible, reference numerals that represent similar circuit elements shall have similar numbering even though they appear on different figures. For example, in FIG. 1, the processor is labeled 102, while in FIG. 2, the processor is labeled 202. Thus, in both cases, the processor is labeled "X02," which indicates that the description for one applies to the other, and vice versa, unless it is noted otherwise.

FIG. 2 shows illustrative application circuitry portion 215 and carrier circuitry portion 225. Carrier portion 225 can include circuitry for performing telephone functions (e.g., transmitting data to and receiving data from a communications tower), such as baseband circuitry 224. Carrier circuitry 225 may also include circuitry (not shown) for other wireless communication functions such as Bluetooth and Wi-Fi.

Application portion 215 may include all other circuitry not specifically reserved for carrier portion 225. For example, application portion 215 may include processor 202, storage circuitry 204 (e.g., a hard disk for storing media files), SDRAM 220 and display 210, as well as other circuitry (not shown).

Storage circuitry 204 may be similar to storage circuitry 104 discussed above in connection with FIG. 1 (and thus, the similar numbering of X04). SDRAM 220 may provide content (e.g., instructions) to processor 202 that may enable processor 202 to execute functions of device 200. In certain circumstances, SDRAM 220 may "engage" or "prep" processor 202 by providing it with data to perform one or more functions when device 200 switches from a low power mode to an ON mode (discussed in more detail below). SDRAM 220 may be referred to herein as processor engagement circuitry. For example, when device 200 is operating in a low power mode, SDRAM 220 may store data that may be used to "engage" processor 202 so it knows, for example, a status of device 200 and operate accordingly. In some embodiments, processor 202 and SDRAM 220 may be integrated into a single package. For example, package-on-package technology may be used to provide an integrated processor and memory package. In either case, SDRAM 220 may also be the location in which CODEC 212 is stored.

Display 210 may be any suitable display for displaying media, including graphics, text, and video. In some embodiments, display may be a touch screen display or an LCD. Display 210 may be driven by processor 202 or baseband circuitry 225. When driven by processor 202, a higher bit rate of data may be provided, thereby enabling the display of high resolution graphics, video, and other content to be displayed on display 210. When driven by baseband circuitry 225, a lower bit rate of data may be provided to display screen 210. The data provided by baseband circuitry 225 may be written to display memory 211, which may be memory local to display 210, the contents of which are displayed on display 210. For example, content written to memory 211 and displayed on display 210 may include a clock, a signal strength indicator, and a battery power indicator. This content may be provided by processor 202 or baseband circuitry 225. Though the quantity of data may be less than that provided by processor 202, power consumption may be lower when driving display 210 with baseband circuitry 225 than when being driven by processor 202.

The application portion (e.g., application portion 215) and the carrier portion (carrier portion 225) may each operate in accordance with the principles of the present invention. For example, carrier portion 225 may receive a compressed data stream of information that represents a song compressed using, for example, the AAC CODEC. If, for purposes of illustration, we assume that CODEC 212 is not the AAC CODEC, then media player 200 would not have the ability to play back the requested song. Media player 200, however, includes the capability to automatically download the specific CODEC required for the task at hand—in this case the AAC CODEC (as is explained in more detail below).

Figure 3:
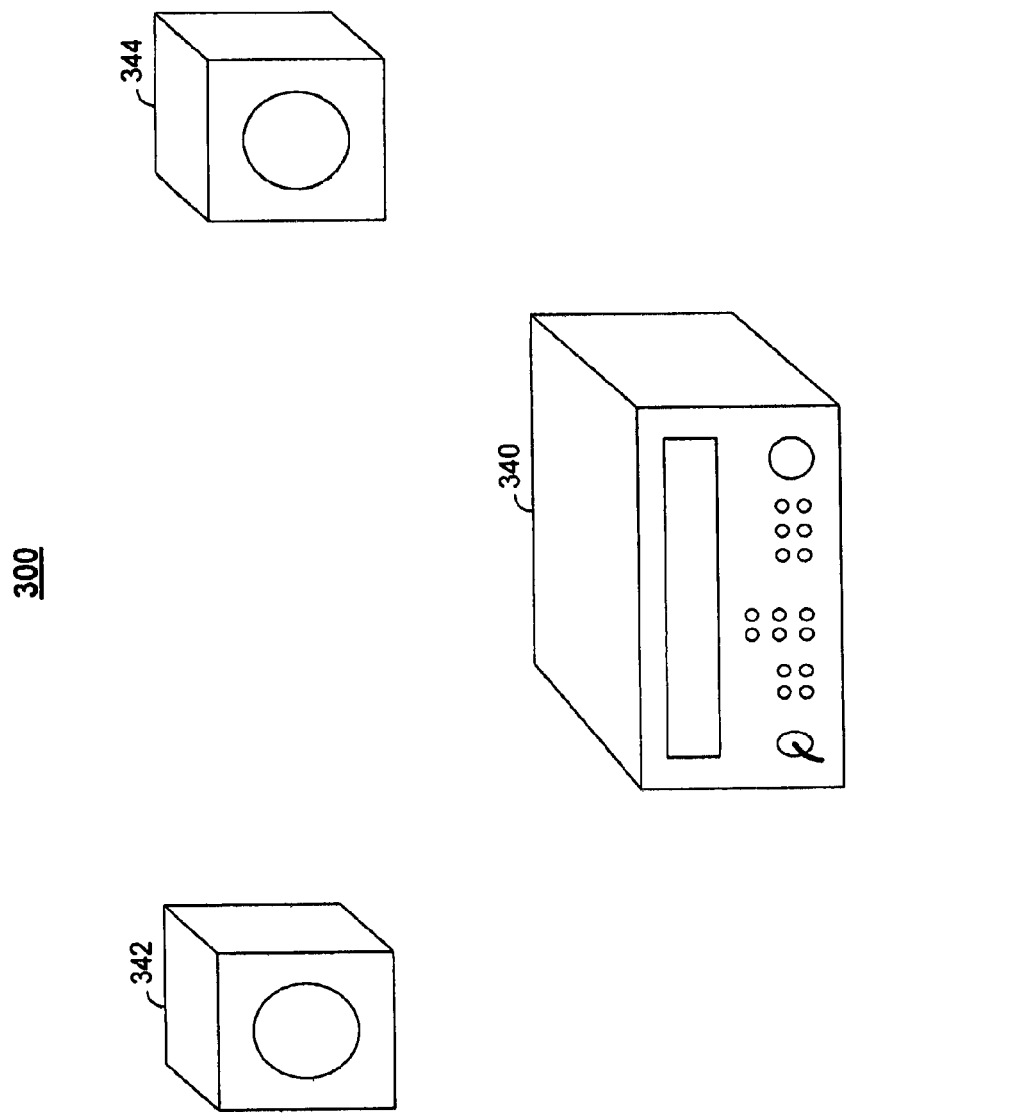
FIG. 3 is an illustration of one embodiment of the present invention.

FIG. 3 shows another embodiment of the present invention in multi-media system 300, which may include receiver/amplifier 340 (which itself can be a physical unit or may be made up of multiple individual components) and speakers 342 and 344. Each of speakers 342 and 344 communicate with receiver 340 wirelessly. In addition, each of speakers 342 and 344 have dedicated memory similar to memory 120 and 220 of FIGS. 1 and 2. In this embodiment, receiver 340 transmits compressed audio signals to speakers 348 and 344. Receiver 340 may also transmit the CODEC necessary to decompress and play back the audio signals. This transmission may occur as a default setting for system 300, or it may be triggered by speakers 343 and 344 if they do not have the CODEC necessary to play back the requested data stream.

FIG. 4 shows another embodiment of the present invention in portable electronic system 400, which in this case, may include multi-media player (in this instance, an iPod) 440 and wireless headphones 442 and 444 (which, while shown to be connected together, may actually be two physically independent headphones). In this embodiment, iPod 440 may be used to store audio files in a variety of different formats, such as AC3, AAC and MP-3. In order to minimize the physical size of the memory that must be installed within headphones 442 and 444 (which also helps to keep manufacturing costs down), system 400 is implemented so that the memory in headphones 442 and 444 (the memory not shown in this figure) is only large enough to store a single CODEC.

When system 400 is required to play back an audio signal for which it does not have the appropriate CODEC (in speakers 442 and 444), iPod 440 transmits the CODEC to speakers 442 and 444 prior to sending the compressed data stream. Persons skilled in the art will appreciate that it may be possible to begin transmitting the data stream prior to the actual transmission of the selected CODEC provided that the receiving device has enough memory to store the incoming data stream so that information is not lost.

Electronic device self-configuration according to the invention may involve similar steps taken in different orders. For example, in accordance with the principles of the present invention, a specific or selected CODEC is wirelessly and seamlessly transmitted to play back unit. In some instances, the transmission of the necessary CODEC will occur by default for each and every song. In other instances, the selected CODEC will only be sent to the play back unit if the play back unit requests it. In still other instances, the device will be able to gather information about the CODECs stored within the play back unit, such that the device always sends the selected CODEC if it does not appear on the list of gathered information. Each of these scenarios will now be described in detail.

Figure 5:
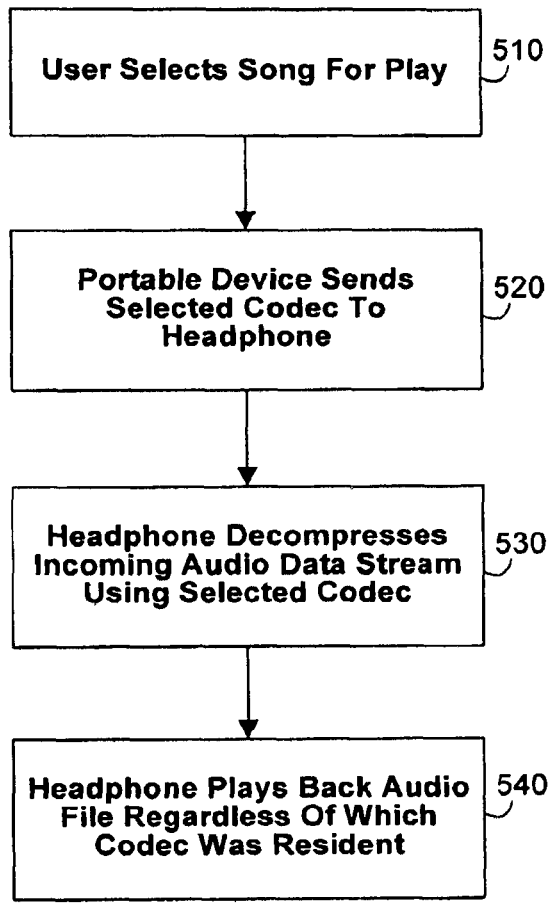
FIG. 5 is a flowchart illustrating steps of a self-configuration scheme according to an embodiment of the present invention the invention.

FIG. 5 is an illustrative flowchart showing various steps of a self-configuration scheme according to the invention. At step 510, a user selects a song to be played. In this instance, the system operates in a default mode whereby, at step 520, the CODEC necessary to decompress the data stream is sent to the play back units (in this case, headphones). The CODEC may be sent as its own message, prior to the transmission of the music file, or it may be appended to the header of the data stream file.

At step 530, the playback unit begins receiving the data stream and decompressing it using the selected CODEC that was transmitted to it earlier. At step 540, the play back unit, or headphones in this case, plays back the file that was produced as a result of the decompression process.

It is understood that the steps shown in FIG. 5 are merely illustrative and that existing steps may be modified, added or omitted.

Figure 6:
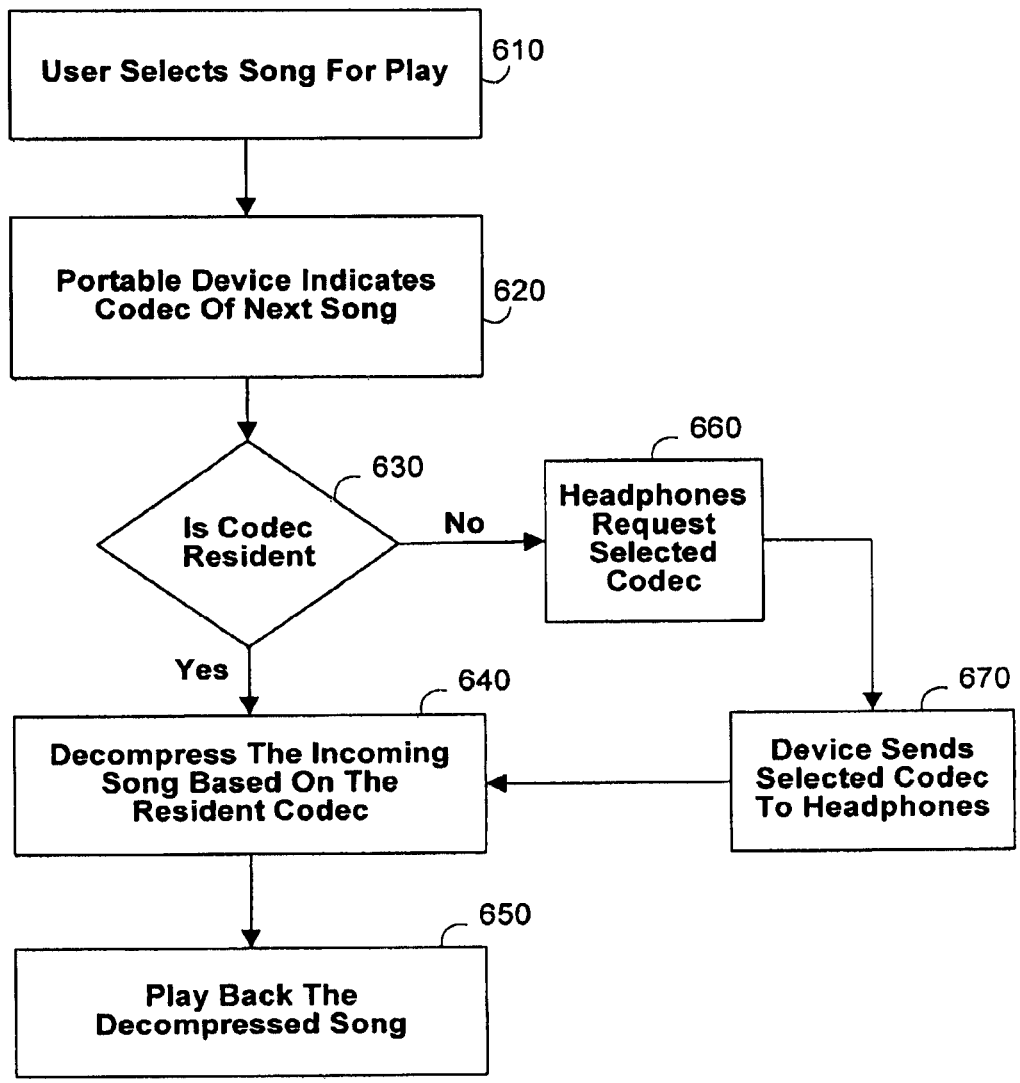
FIG. 6 is a flowchart illustrating steps of another self-configuration scheme according to another embodiment of the present invention the invention.

FIG. 6 is an illustrative flowchart showing various steps of another self-configuration scheme according to the invention. This flowchart refers to a self-configuration scheme in which the selected CODEC is only transmitted to the play back unit if that unit requests the CODEC. Starting at step 610, the user selects a song to be played. At step 620, the portable devices indicates to the play back unit which CODEC will be required in order to properly decompress and play back the incoming data stream. At step 630, the play back unit determines whether the CODEC is resident in the unit itself.

If the CODEC is resident in the play back unit, the play back unit, in a step 640, begins decompressing the data stream utilizing the resident CODEC. The decompressed data is then played back in step 650. If the CODEC is not resident in the play back unit, however, the play back unit must request the codec from the portable device in step 660. The portable device sends the selected CODEC to the play back unit in step 670, which then continues as described above with respect to steps 640 and 650.

It is understood that the steps shown in FIG. 6 are merely illustrative and that existing steps may be modified, added or omitted. For example, while the description of the steps for FIGS. 5 and 6 included a description of playing back a song, the principles of the present invention equally apply to other transmittable items, such as videos.

Figure 7:
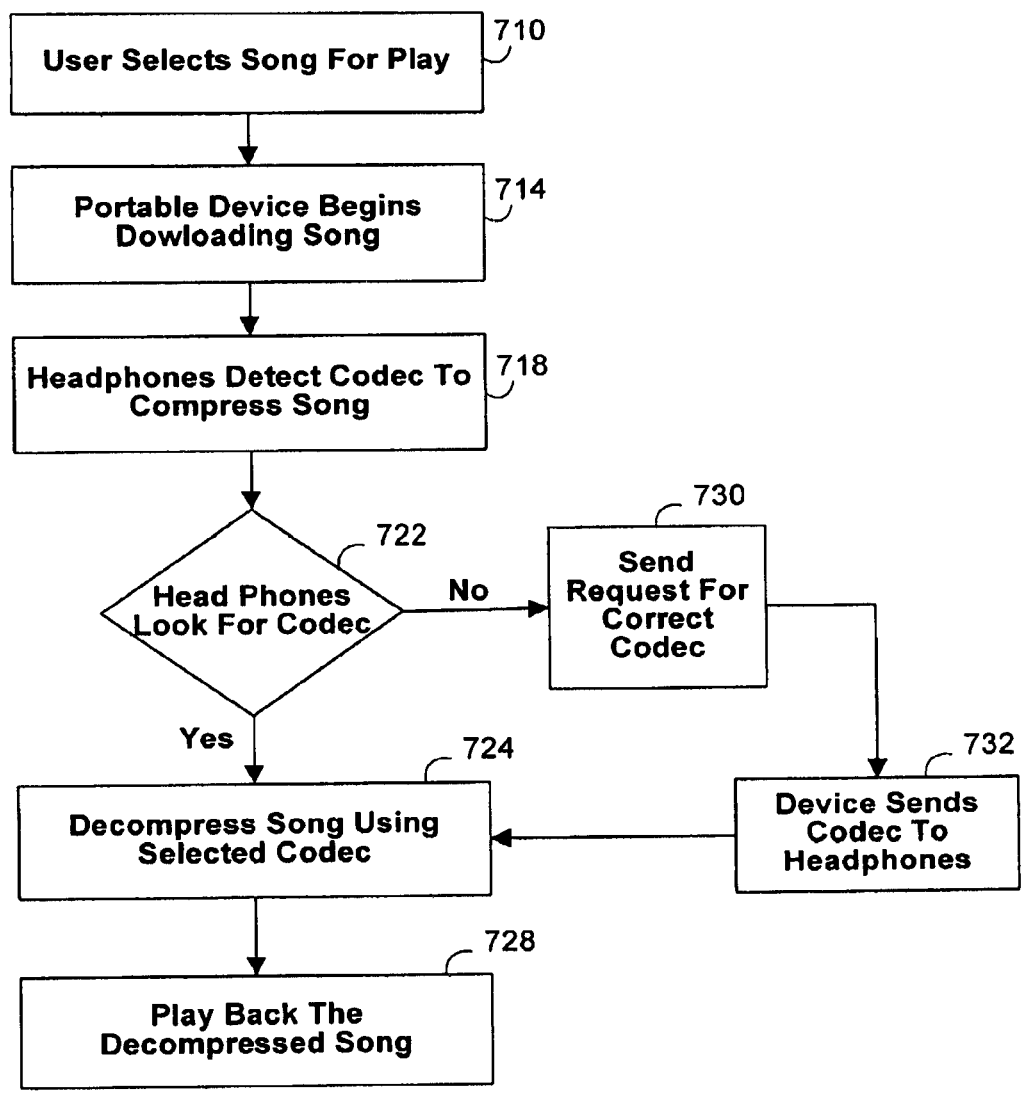
FIG. 7 is a flowchart of another self-configuration scheme in accordance with an additional embodiment of the present invention.

FIG. 7 is an illustrative flowchart showing various steps of another self-configuration scheme according to the invention. This flowchart refers to another self-configuration scheme in which the selected CODEC is only transmitted to the play back unit if that unit requests the CODEC, in a manner similar to that described above with respect to FIG. 6. Starting at step 710, the user selects a song to be played. At step 714, the portable devices begins downloading the compressed song. Unlike the steps shown and described in FIG. 6, however, where the electronic device sent an indication of the selected CODEC to be used, the play back unit reviews the incoming data stream, in step 718, and makes a determination of whether it has the CODEC it needs to decompress the incoming data stream, in step 722.

If the CODEC is resident in the play back unit, the play back unit, in a step 724, begins decompressing the data stream utilizing the resident CODEC. The decompressed data is then played back in step 728. If the CODEC is not resident in the play back unit, however, the play back unit must request the codec from the portable device in step 730. The portable device sends the selected CODEC to the play back unit in step 732, which then continues as described above with respect to steps 724 and 728.

It is understood that the steps shown in FIG. 7 are merely illustrative and that existing steps may be modified, added or omitted. For example, while the description of the steps for FIGS. 5-7 included a description of playing back a song using headphones, the principles of the present invention equally apply to other systems, such as a receiver/amplifier and wireless speaker combination.

Figure 8:
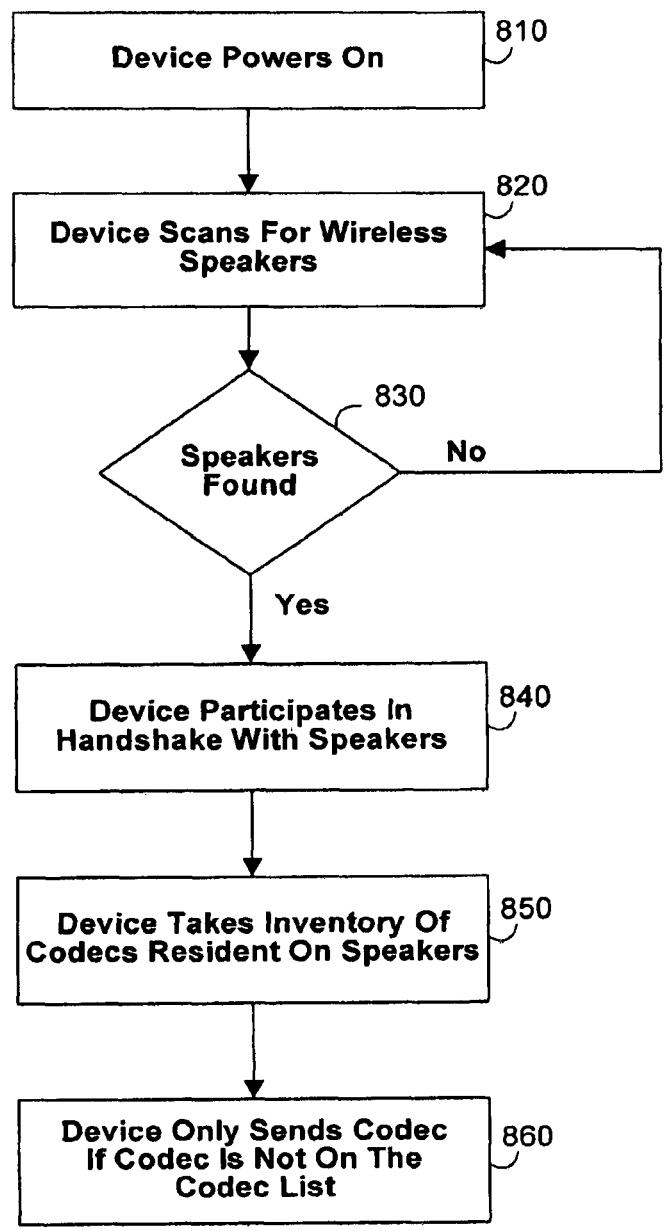
FIG. 8 is a flowchart of another self-configuration scheme in accordance with an embodiment of the present invention.

FIG. 8 is a flowchart of another self-configuration scheme in accordance with the principles of the present invention. Starting at step 810, the portable device powers ON. Once the device is powered ON, it begins scanning for compatible devices in step 820, such as wireless speakers. If none are found in step 830, the system loops back to step 820, and continues in that loop until speakers are eventually located.

Once speakers are found in step 830, the system moves on to the next step. In step 840, the devices participates in handshake process with the speakers. As part of that process, however, the electronic device takes an inventory, in step 850, of the CODECs that are resident in the speakers. The process then continues in step 860 a manner similar to that described above for FIGS. 5-7, except the device only sends the selected CODEC if it knows that the selected CODEC is not in the inventory of the play back units.

It is understood that the steps shown in FIG. 8 are merely illustrative and that existing steps may be modified, added or omitted.

Thus it is seen that systems and methods for self-configuring electronic devices are provided. It is understood that the steps shown in the flowcharts discussed above are merely illustrative and that existing steps may be modified, added or omitted. Those skilled in the art will appreciate that the invention can be practiced by other than the described embodiments, which are presented for purposes of illustration rather than of limitation, and the invention is limited only by the claims which follow.

What is claimed is:

1. A method for configuring a system having at least a transmitting device and a receiving device, the method performed at the receiving device comprising:
   transmitting, from the receiving device, information indicating one or more CODECs resident in memory of the receiving device to the transmitting device which in response to receiving the information determines whether the receiving device has a specific CODEC resident in the memory of the receiving device;
   receiving wirelessly at the receiving device the specific CODEC from the transmitting device only if the specific CODEC is not resident in the memory of the receiving device;
   receiving wirelessly at the receiving device a data stream which has been compressed using the specific CODEC.

2. The method of claim 1 wherein the data stream is one of a video or a song.

3. The method of claim 2 wherein the receiving device is a playback unit having at least one speaker.

4. The method of claim 3 wherein the playback unit displays the video.

5. The method of claim 1 further comprising:
   receiving at the receiving device a notification, sent in response to receiving at the transmitting device a command to play the data stream, that the data stream is about to be transmitted.

6. The method of claim 5 wherein the information is transmitted in response to the notification.

7. A multimedia player for operation with a playback unit, the multimedia player comprising:
   a user interface that receives a command to play a data stream that has been compressed using a specific CODEC;
   a processor, coupled to the user interface, that determines whether the playback unit has the specific CODEC resident in memory in response to the user interface receiving the command; and
   communications circuitry, coupled to the processor, that:
      wirelessly receives, from the playback unit, information indicating CODECs resident in the memory of the playback unit before the processor determines whether the playback unit has the specific CODEC resident in memory;

wirelessly sends the specific CODEC to the playback unit only if the specific CODEC is not resident in the memory in the playback unit; and wirelessly sends the data stream to the playback unit.

8. The multimedia player of claim 7, wherein the communications circuitry also notifies the playback unit that the data stream is about to be transmitted in response to the user interface receiving the command.

9. The multimedia player of claim 7, wherein the communications circuitry also scans for playback unit in response to the user interface receiving the command.

10. The multimedia player of claim 7, wherein the processor also takes an inventory of any CODECs that are resident in the memory of the playback unit in response to the user interface receiving the command.

11. The multimedia player of claim 7, wherein the processor also gathers information about any CODECs that are stored in the memory of the playback unit in response to the user interface receiving the command.

12. A machine readable non-transitory storage medium storing executable instructions which when executed perform a method for configuring a system having at least a transmitting device and a receiving device, the method performed at the receiving device comprising:

transmitting, from the receiving device, information indicating one or more CODECs resident in memory of the receiving device to the transmitting device which in response to receiving the information determines whether the receiving device has a specific CODEC resident in the memory of the receiving device;

receiving wirelessly at the receiving device the specific CODEC from the transmitting device only if the specific CODEC is not resident in the memory of the receiving device;

receiving wirelessly at the receiving device a data stream which has been compressed using the specific CODEC.

13. The medium of claim 12 wherein the data stream is one of a video or a song.

14. The medium of claim 13 wherein the receiving device is a playback unit having at least one speaker.

15. The medium of claim 14 wherein the playback unit displays the video.

16. The medium of claim 12, the method comprising:

receiving at the receiving device a notification, sent in response to receiving at the transmitting device a command to play the data stream, that the data stream is about to be transmitted.

17. The medium of claim 16 wherein the information is transmitted in response to the notification.

\* \* \* \* \*